S. P. BRIGGS.
Hand-Seeder.
No. 17,362. Patented May 26, 1857.
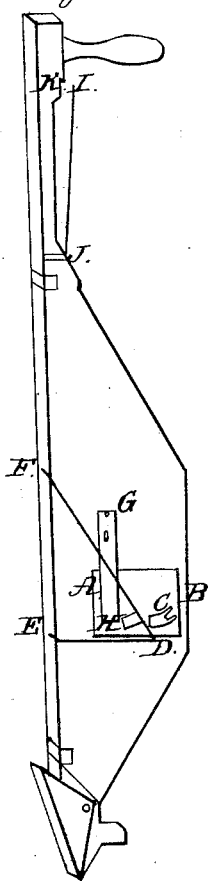
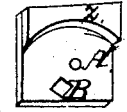

UNITED STATES PATENT OFFICE.

SILAS P. BRIGGS, OF SARATOGA SPRINGS, NEW YORK.

IMPROVED HAND SEED-PLANTER.

Specification forming part of Letters Patent No. 17,362, dated May 26, 1857.

*To all whom it may concern:*

Be it known that I, SILAS P. BRIGGS, of Saratoga Springs, county of Saratoga, and State of New York, have invented new and useful Improvements in Hand Seed-Planters; and I do hereby declare that the following is a full and exact description thereof, reference being had to the accompanying drawings, and to the letters of reference marked thereon.

The nature of my invention consists in the use of revolving chambers to separate the seed requisite to be deposited in each hill, with a striker to assist in filling the chambers, the apparatus connected with the plunger for giving the chamber-wheel motion, and a set to fasten the plunger at will to enable the operator to force the machine into the earth the desired depth.

To enable others skilled in the art to make and use my invention, I will proceed to describe its construction and operation.

My improvement may be applied to hand seed-planters of ordinary construction, the object being to make a more uniform dropper and to enable the operator to put the seeds deeper in hard ground.

Figure I exhibits a machine with the general features of hand-planters. At a convenient point in the box I insert a horizontal wheel, W, with several cavities or chambers in it for selecting the seeds, in a frame-work, as exhibited at A B, Fig. I. The wheel has notches in the rim, which appear at C. D is a wire spring attached at E and F to the sliding piece or plunger. H is a thin flat spring attached to the box at G. In operating, as the plunger descends the wire D, being elastic, slips over a notch in the rim of the wheel, the wheel being kept from turning back by the spring H, which has previously dropped into a notch. When the plunger ascends the slanting wire D carries the wheel round the distance of one notch, which causes one chamber to come over an opening below and discharge its seeds, which pass into the delivering apparatus at the bottom of the machine.

Fig. II represents the bottom board of the frame-work, with a pivot at A' for the wheel to turn on, (or a hole, if the pivot be on the wheel,) and the discharging-aperture at B. There is also on the back part of this piece one other piece, Z, a trifle thicker than the wheel, with concave edge, which supports the frame above.

Fig. IV represents the piece X above the wheel, with an opening large enough to expose nearly all the chambers of the wheel W to the seeds in the box, so that each chamber while thus open to receive seed has several motions before discharging. $A^2$ is the hole in which the brush is secured to hold back the seed in the box as the chamber passes under to discharge through the opening in Fig. II. $B^2$, Fig. IV, is a striker, of wire or other elastic substance, made fast to this part and lying out over the chambers as they pass, its tendency being to make them fill more evenly and perfectly. More than one may be used.

Fig. III is the wheel W, with chambers $p$. To change the size of chambers use different wheels.

In Fig. I, I is the set or fastener, consisting of an elastic rod made fast in the box at J. At B in the plunger is a notch into which the upper end of the rod may be placed by a slight motion of the thumb or other part of the hand operating the machine, which will fasten the plunger, so that the machine may be pressed into the earth with as much force as the operator pleases, and then, the rod I being let loose, the plunger be driven down.

What I claim as my invention, and desire to secure by Letters Patent, is—

The set or fastener I, in combination with the plunger, arranged and operated substantially in the manner and for the purpose set forth.

SILAS P. BRIGGS.

Witnesses:
LYMAN E. FRENCH,
J. D. BRIGGS.